United States Patent [19]

Couturier

[11] 4,383,373
[45] May 17, 1983

[54] METHOD OF AND APPARATUS FOR CALIBRATING AN ADJUSTABLE JIG

[76] Inventor: Alain Couturier, "Le Taureau" Chemin du Pivolet, Chaponost (Rhône), France

[21] Appl. No.: 309,478

[22] Filed: Oct. 7, 1981

[30] Foreign Application Priority Data

Oct. 8, 1980 [FR] France .............................. 80 21872

[51] Int. Cl.³ ....................... G01C 15/00; G01B 11/03
[52] U.S. Cl. ..................................... 33/286; 33/1 CC; 33/181 AT; 33/185 V; 33/228
[58] Field of Search ............. 33/1 CC, 1 DD, 125 A, 33/185 V, 180 R, 180 AT, 181 R, 181 AT, 227, 228, 286, 288

[56] References Cited

U.S. PATENT DOCUMENTS

| | | | |
|---|---|---|---|
| 1,428,861 | 9/1922 | Schultz | 33/228 |
| 1,551,393 | 8/1925 | Hewlett et al. | 33/228 |
| 2,644,361 | 7/1953 | Birdsall | 33/1 CC |
| 2,659,824 | 11/1953 | Burnham | 33/286 |
| 3,117,480 | 1/1964 | Peddinghaus | 33/286 |
| 3,130,633 | 4/1964 | Rantsch | 33/286 |
| 3,633,010 | 1/1972 | Svetlichny | 33/125 A |

Primary Examiner—Richard R. Stearns
Attorney, Agent, or Firm—Karl F. Ross

[57] ABSTRACT

In order to determine the correct relative positions of marker tips on an adjustable jig used for chassis and body repairs of a damaged automotive vehicle, a three-dimensional representation of the spatial distribution of characteristic points of the vehicular structure is created by means of two projectors emitting pairs of intersecting light rays with the aid of mostly opaque slides bearing conjugate patterns of transparent dots. In a presetting operation the projectors are so oriented that certain—preferably distinctly colored—light rays traversing their slides intersect at fixed spots on a stationary wall against which the jig is subsequently placed for an adjustment of its markers until their tips coincide with the intersections of respective pairs of preferably distinctively colored orientation rays. The slides may also bear projectable legends indicating the type of vehicle to which they pertain.

7 Claims, 2 Drawing Figures

METHOD OF AND APPARATUS FOR CALIBRATING AN ADJUSTABLE JIG

FIELD OF THE INVENTION

My present invention relates to a method of and an apparatus for calibrating an adjustable jig, particularly (though not exclusively) one to be used in the repair of automotive vehicles.

BACKGROUND OF THE INVENTION

When the body and/or the chassis of a vehicle involved in an accident is to be repaired, e.g. with the aid of a reshaping apparatus of the type described in my prior U.S. Pat. No. 4,221,122, it is customary to use a jig with adjustable markers whose tips indicate the relative positions of characteristic points of the structure to be reshaped. Since vehicles of different makes or types generally vary in the locations of these characteristic points, separate lists must be consulted for the adjustment of the markers of such a jig preparatorily to its use with a given model. Such adjustment is laborious and often inexact since the markers, which usually are in the form of extensible rods, may have been deformed so that their tips do not occupy the proper locations even if their bases are precisely positioned according to scale graduations present on the jig. The maintenance of a fixedly preset jig for each type of vehicle, on the other hand, is a space-consuming and expensive undertaking, aside from the need for an occasional updating of the settings.

OBJECTS OF THE INVENTION

An object of my present invention, therefore, is to provide a method enabling the convenient adjustment of the marker points of such a jig with avoidance of the inconveniences referred to.

A related object is to provide an apparatus for practicing my improved jig-calibration method.

SUMMARY OF THE INVENTION

In accordance with my present invention, I provide two image carriers—preferably transparencies—with patterns of bright dots representing correlated images, viewed from different angles, of characteristic points of a prototype of the structure to be shaped. I then project light rays from the dots of these patterns into space at the same relative angles at which they were imaged whereby pairs of correlated rays intersect at locations whose relative positions correspond to those of the respective prototype points. With the aid of this three-dimensional representation of the spatial distribution of the characteristic points of the structure (e.g. a vehicle body or chassis) to be shaped, the jig markers are positioned to make their tips coincide with the respective ray intersections.

Advantageously, the patterns of the image carriers include additional dots of suitable brightness which represent correlated images of several fixed spots on a reference surface against which a jig can be placed, the light rays emitted by these additional dots being used for an initial presetting of two projectors from which the various light rays emanate. The rays utilized for this presetting operation, which will be referred to hereinafter as orientation rays, differ in color from the locating rays used for the actual calibration of the jig markers.

BRIEF DESCRIPTION OF THE DRAWING

The above and other features of my present invention are now being explained in detail with reference to the accompanying drawing in which.

SPECIFIC DESCRIPTION

Figure 1:
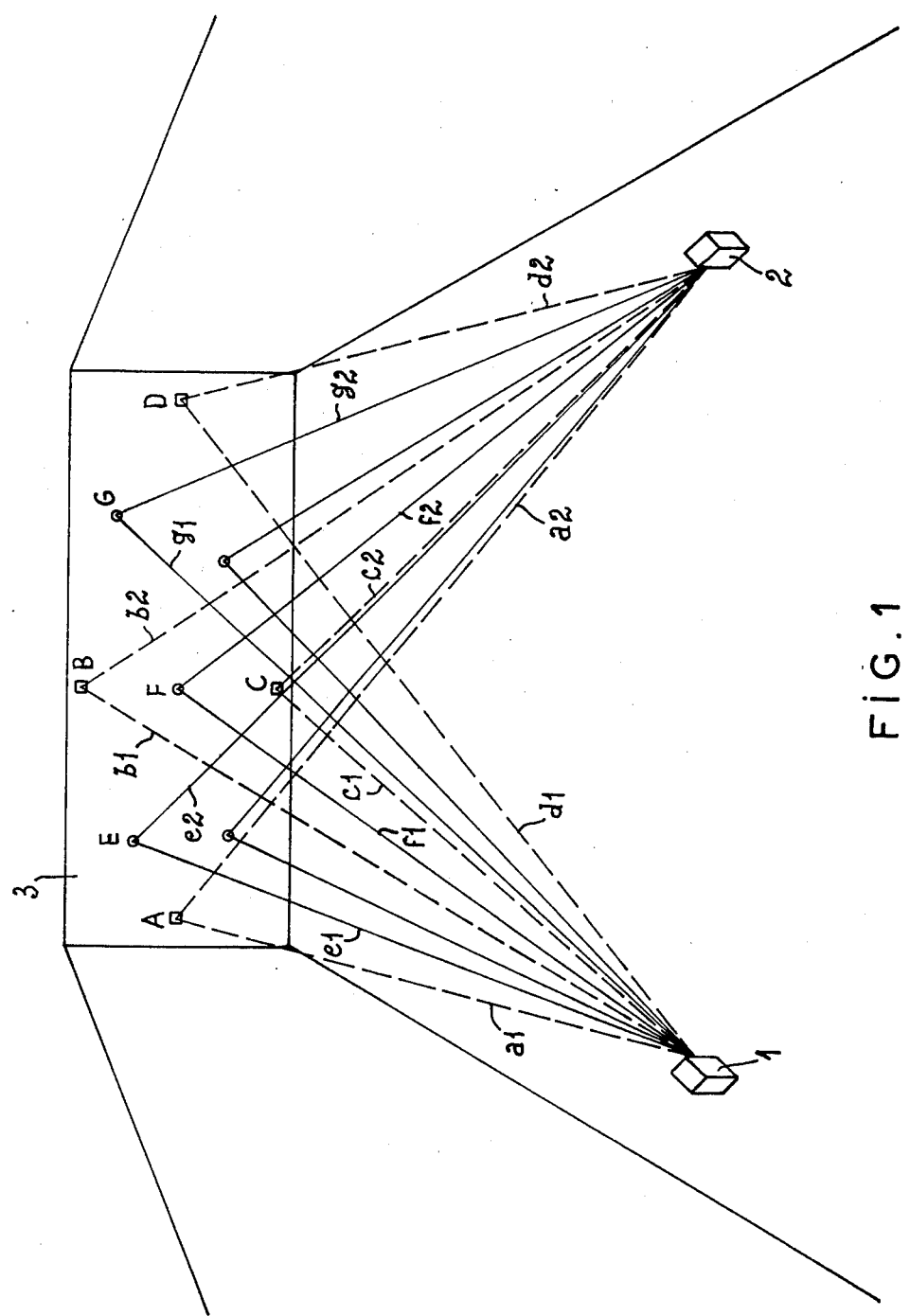
FIG. 1 is a diagrammatic perspective view serving to explain the present method.
Figure 2:
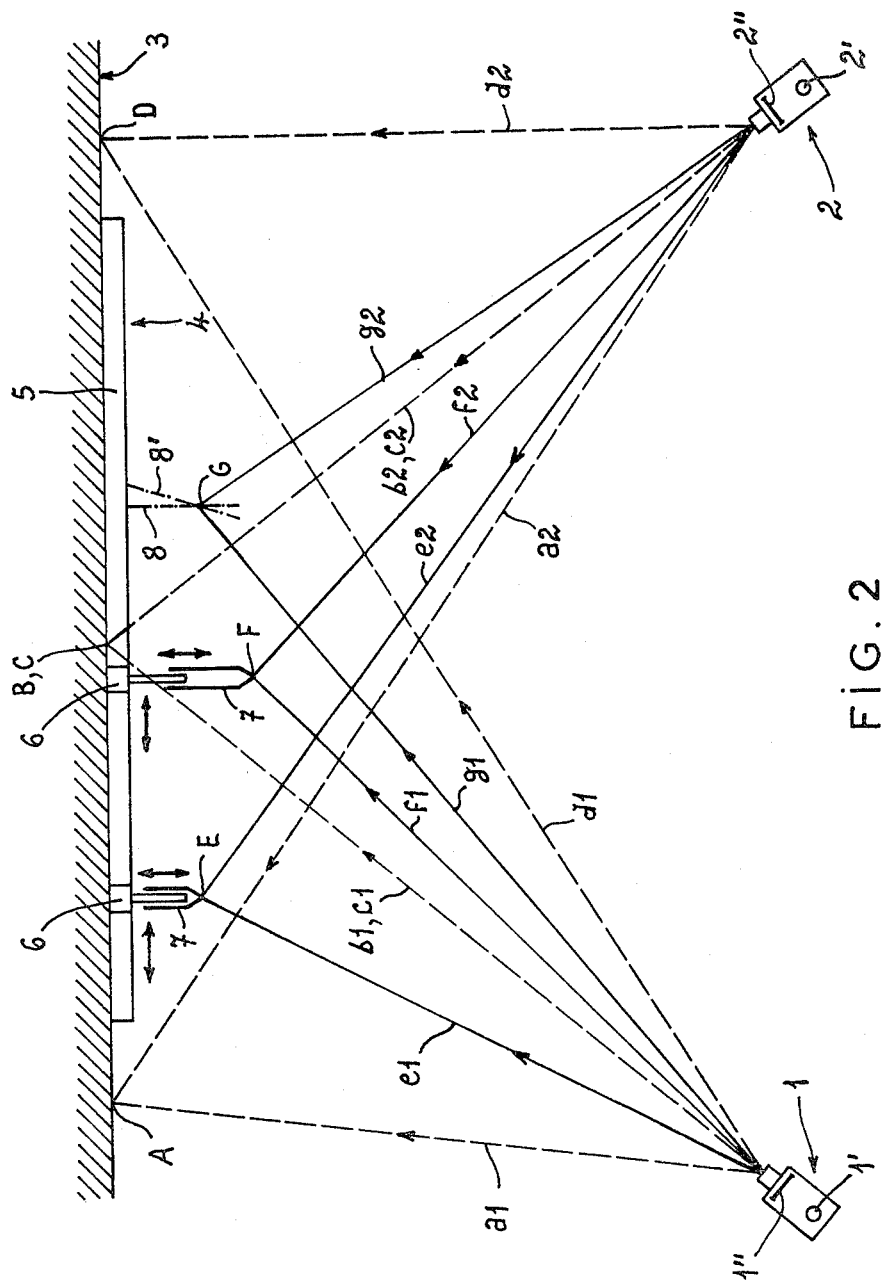
FIG. 2 is a top view of an apparatus used in accordance with my invention for the calibration of a jig having a number of adjustable markers.

In FIGS. 1 and 2 I have shown two optical projectors 1 and 2 whose axes are inclined to each other at an angle of approximately 90°. The projectors are of conventional type and are provided with respective lamps 1' and 2' for the translumination of slides 1" and 2" carrying patterns of luminous dots on a dark background. The lenses of these projectors thus produce two sets of divergent light rays which are trained upon a reference surface 3, specifically a wall of an automobile-repair shop. Clearly indicated on surface 3 are four fixed spots A, B, C and D, representing the corners of a rhomboid with a major horizontal diagonal, whose images are represented by distinctly colored dots on the slides 1" and 2". With proper positioning of projectors 1 and 2, therefore, orientation rays $a_1$, $b_1$, $c_1$ and $d_1$ emitted by projector 1 intersect associated orientation rays $a_2$, $b_2$, $c_2$, $d_2$ exactly at the spots A, B, C and D, respectively. With the aid of these orientation rays (shown dotted in the drawing), therefore, the projectors 1 and 2 can be accurately preset.

Other luminous dots of slides 1" and 2" give rise to respective locating rays $e_1$, $f_1$, $g_1$ . . . and $e_2$, $f_2$, $g_2$ . . . which intersect in pairs at points E, F, G . . . forming a three-dimensional array. A jig 4 placed against wall surface 3 comprises a rigid frame 5 with horizontally slidable uprights 6 which can be immobilized thereon (e.g. in the manner described for the portals of a repair apparatus in my prior U.S. Pat. No. 4,221,122) on a beam of that frame; each of these uprights supports one or more markers 7 which are vertically displaceable thereon and can be secured in any selected position. The markers 7 are telescoped members adapted to be expanded or retracted until their tips coincide with the intersections E, F, G etc. of corresponding pairs of locating light rays. Even if a marker were deformed so that its axis 8' is inclined to a surface normal 8, as diagrammatically indicated by phantom lines, that marker can still be used as long as its tip coincides with the point of intersection (here G) of the respective pair of light rays.

The patterns of slides 1' and 2' can be readily produced, by cameras occupying the positions of projectors 1 and 2, with the aid of punctiform light sources or reflectors at spots A, B, C, D and at the tips of markers of a jig positioned to fit an intact prototype of the vehicle to be repaired. The slides, advantageously, also carry legends which are projected upon wall surface 3 and which indicate the type of car to which they pertain, possibly together with operating instructions.

Since the general locations of the intersections E, F, G etc. of the locating rays emitted by projectors 1 and 2 are normally known in advance, it is usually not necessary to distinguish among the several locating rays $e_1$, $f_1$, $g_1$ . . . and $e_2$, $f_2$, $g_2$. . . . These locating rays, however, could also be color-coded in order to avoid possible ambiguities. Detection of the intersections is facilitated by the use of a dark mobile screen onto which the convergent rays of a pair are focused.

The projectors 1 and 2 may be accommodated in wall niches or suspended from the ceiling of the repair shop schematically illustrated in FIG. 1.

I claim:

1. A method of calibrating an adjustable jig with independently displaceable markers having tips indicative of the correct relative positions of characteristic points of a structure to be put into shape, comprising the steps of:
    (a) preparing two image carriers with respective patterns of bright dots representing correlated images, viewed from different angles, of characteristic points of a prototype of the structure to be shaped;
    (b) projecting light rays from the dots of said patterns into space at the same relative angles at which they were imaged;
    (c) detecting the intersections of pairs of correlated light rays pertaining to respective points of said prototype; and
    (d) positioning the tips of said markers at the intersections so detected.

2. The method defined in claim 1 wherein said image carriers are slides transluminated by respective projectors to form said light rays.

3. The method defined in claim 2 wherein said patterns include additional bright dots representing correlated images of several fixed spots on a reference surface, said projectors being initially preset by training correlated further light rays from said additional dots onto said reference surface and changing the direction of said further light rays until their intersections coincide with said fixed spots.

4. The method defined in claim 3 wherein said further light rays are distinct in color from the light rays projected in step (b).

5. The method defined in claim 2, 3 or 4 wherein the object to be shaped is an automotive vehicle, said slides being provided with projectable legends identifying the type of vehicle to which they pertain.

6. An apparatus for calibrating an adjustable jig with independently adjustable markers having tips indicative of the correct relative positions of characteristic points of a structure to be put into shape, comprising:
    a pair of projectors adapted to emit divergent light rays from respective image carriers with respective patterns of bright first dots representing correlated images, viewed from different angles, of characteristic points of a prototype of the structure to be shaped; and
    a reference surface confronting said projectors and bearing a plurality of fixed spots, said pattern further including bright second dots representing correlated images of said fixed spots from which light rays emitted toward said reference surface coincide at the respective spots upon a correct presetting of said projectors, the jig to be calibrated being positionable in front of said reference surface for alignment of its marker tips with the intersections of corresponding pairs of correlated rays emitted from said first dots.

7. An apparatus as defined in claim 6 wherein said reference surface is a wall of a repair shop for automotive vehicles.

* * * * *